United States Patent
Iwabuchi

(10) Patent No.: US 10,091,376 B2
(45) Date of Patent: Oct. 2, 2018

(54) INFORMATION PROCESSING DEVICE, NON-TRANSITORY COMPUTER READABLE MEDIUM, AND INFORMATION PROCESSING METHOD

(71) Applicant: FUJI XEROX CO., LTD., Tokyo (JP)

(72) Inventor: Takahiro Iwabuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/446,590

(22) Filed: Mar. 1, 2017

(65) Prior Publication Data

US 2018/0069978 A1    Mar. 8, 2018

(30) Foreign Application Priority Data

Sep. 7, 2016 (JP) .................................. 2016-174482

(51) Int. Cl.
| | |
|---|---|
| G06K 15/00 | (2006.01) |
| H04N 1/00 | (2006.01) |
| H04N 1/32 | (2006.01) |
| G06F 3/12 | (2006.01) |

(52) U.S. Cl.
CPC ....... *H04N 1/00891* (2013.01); *G06F 3/1204* (2013.01); *G06F 3/1221* (2013.01); *G06F 3/1229* (2013.01); *G06F 3/1236* (2013.01); *G06F 3/1239* (2013.01); *G06F 3/1274* (2013.01); *H04N 1/3201* (2013.01); *H04N 2201/0094* (2013.01)

(58) Field of Classification Search
CPC ........ H04N 1/00891; H04N 2201/0094; G06F 3/1204; G06F 3/1221; G06F 3/1229; G06F 3/1236; G06F 3/1239; G06F 3/1274
See application file for complete search history.

(56) References Cited

U.S. PATENT DOCUMENTS

| | | | | |
|---|---|---|---|---|
| 5,884,122 A | * | 3/1999 | Kawabuchi | G03G 15/5004 399/43 |
| 2008/0192286 A1 | * | 8/2008 | Shaw | G06F 21/62 358/1.15 |
| 2011/0317207 A1 | * | 12/2011 | Shimizu | G06F 1/20 358/1.15 |
| 2012/0162714 A1 | * | 6/2012 | Ohhashi | G06F 3/122 358/1.15 |
| 2013/0201512 A1 | * | 8/2013 | Takatani | H04N 1/00891 358/1.13 |
| 2013/0208297 A1 | * | 8/2013 | Kawanishi | G06K 15/1817 358/1.14 |
| 2014/0126012 A1 | * | 5/2014 | Chung | G06K 15/1817 358/1.15 |
| 2015/0055183 A1 | * | 2/2015 | Kaneko | G06F 3/1267 358/1.16 |

(Continued)

FOREIGN PATENT DOCUMENTS

JP    2014-094471 A    5/2014

*Primary Examiner* — Moustapha Diaby
(74) *Attorney, Agent, or Firm* — Oliff PLC

(57) ABSTRACT

An information processing device includes: a receiver that receives a job that is a unit of processing of predetermined processing, an effective period of the job, and a shutdown command which sets a power supply of the device itself to a shutdown state; and a controller that, when the shutdown command is received by the receiver and no job has been received by the receiver and accumulated, performs control to set the power supply to the shutdown state.

15 Claims, 9 Drawing Sheets

(56) References Cited

U.S. PATENT DOCUMENTS

2015/0192889 A1\* 7/2015 Osawa ............... G03G 15/5075
399/88
2016/0328186 A1\* 11/2016 Anei ....................... G06F 3/126

\* cited by examiner

| JOB NAME | USER ID | EFFECTIVE PERIOD EXPIRATION TIME | ... |
|---|---|---|---|
| jobA | UserA | 10:30:46 | ... |
| jobB | UserB | 10:50:12 | ... |
| jobC | UserB | 11:00:00 | ... |
| ... | ... | ... | ... |

70

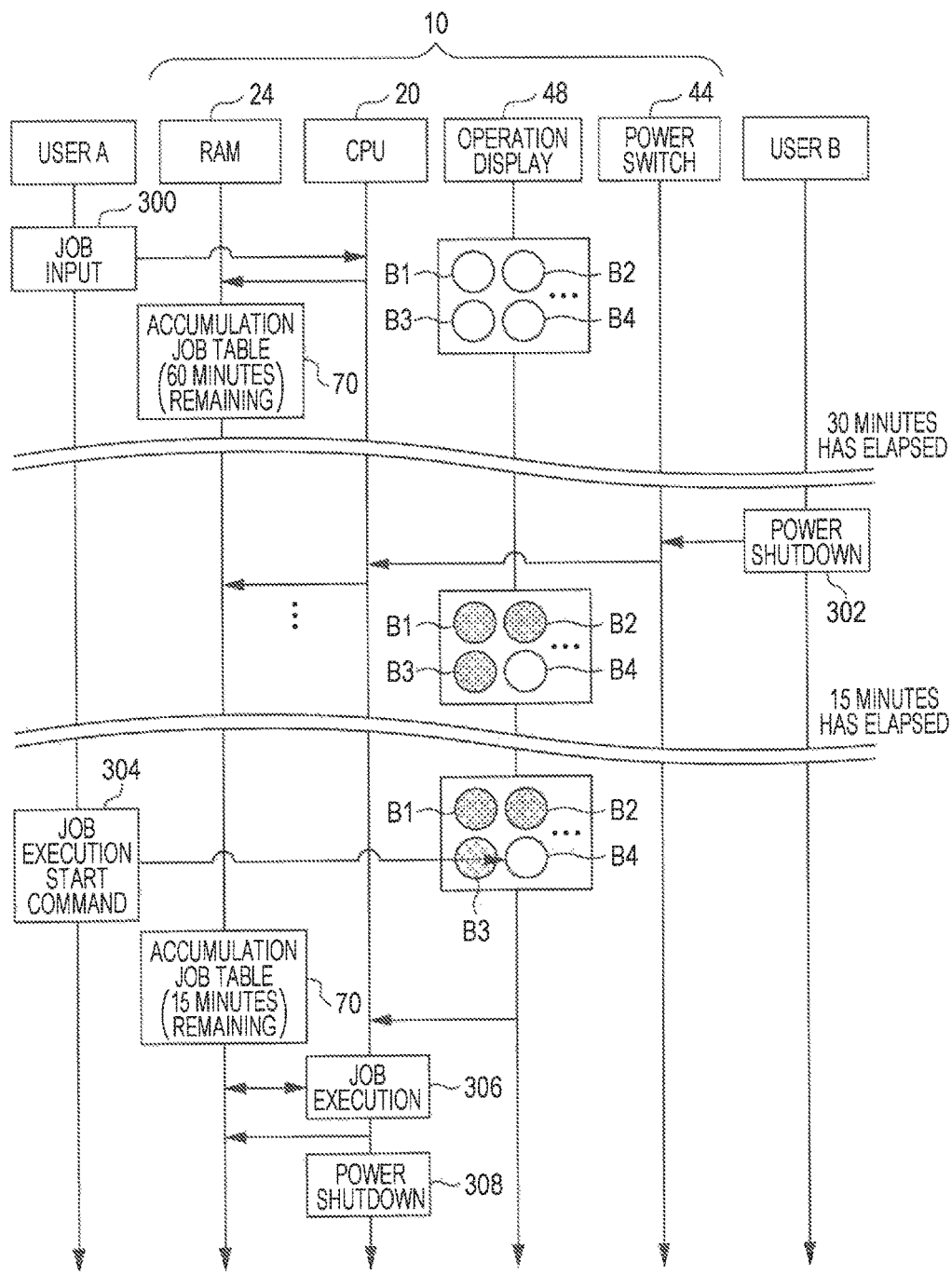

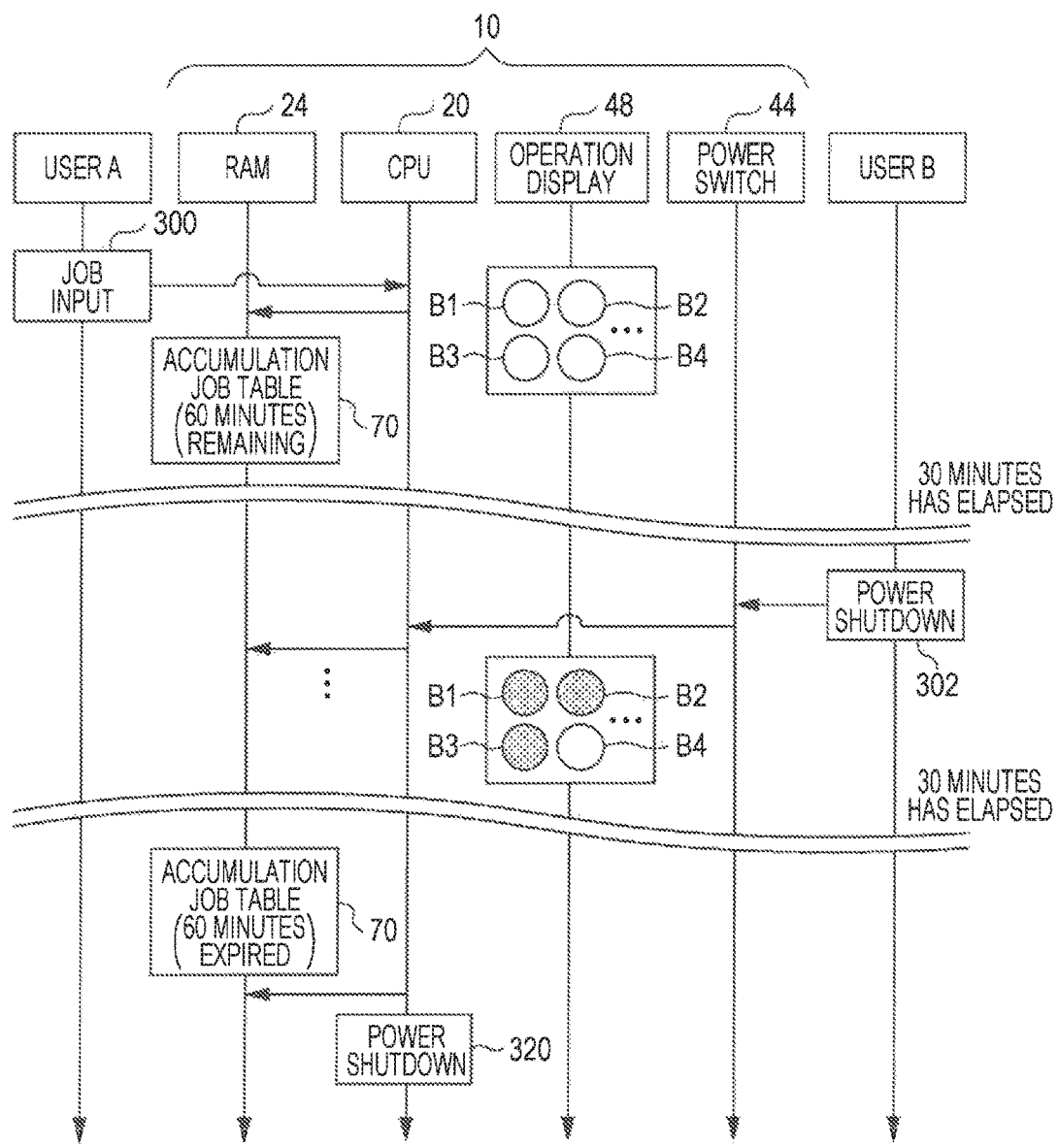

INFORMATION PROCESSING DEVICE, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2016-174482 filed on Sep. 7, 2016.

BACKGROUND

Technical Field

The present invention relates to an information processing device, a non-transitory computer readable medium, and an information processing method.

SUMMARY

An aspect of the invention provides an information processing device including: a receiver that receives a job that is a unit of processing of predetermined processing, an effective period of the job, and a shutdown command which sets a power supply of the device itself to a shutdown state; and a controller that, when the shutdown command is received by the receiver and no job has been received by the receiver and accumulated, performs control to set the power supply to the shutdown state.

BRIEF DESCRIPTION OF THE DRAWINGS

Exemplary embodiment of the present invention will be described in detail based on the following figures, wherein:

FIG. 13 is a sequence diagram illustrating an example of processing of shutting down the power supply of the image processing device according to the exemplary embodiment; and FIG. 14 is another sequence diagram illustrating an example of processing of shutting down the power supply of the image processing device according to the exemplary embodiment.

DETAILED DESCRIPTION

Hereinafter, an exemplary embodiment for carrying out the present invention will be described in detail with reference to the drawings. Here, as an example of an information processing device, the case will be described in which the present invention is applied to an image processing device having multiple functions such as formation of an image on a paper sheet, reading of an image formed on a paper sheet, and transmission and reception of a facsimile and not having a non-volatile memory for storing image data.

Figure 1:
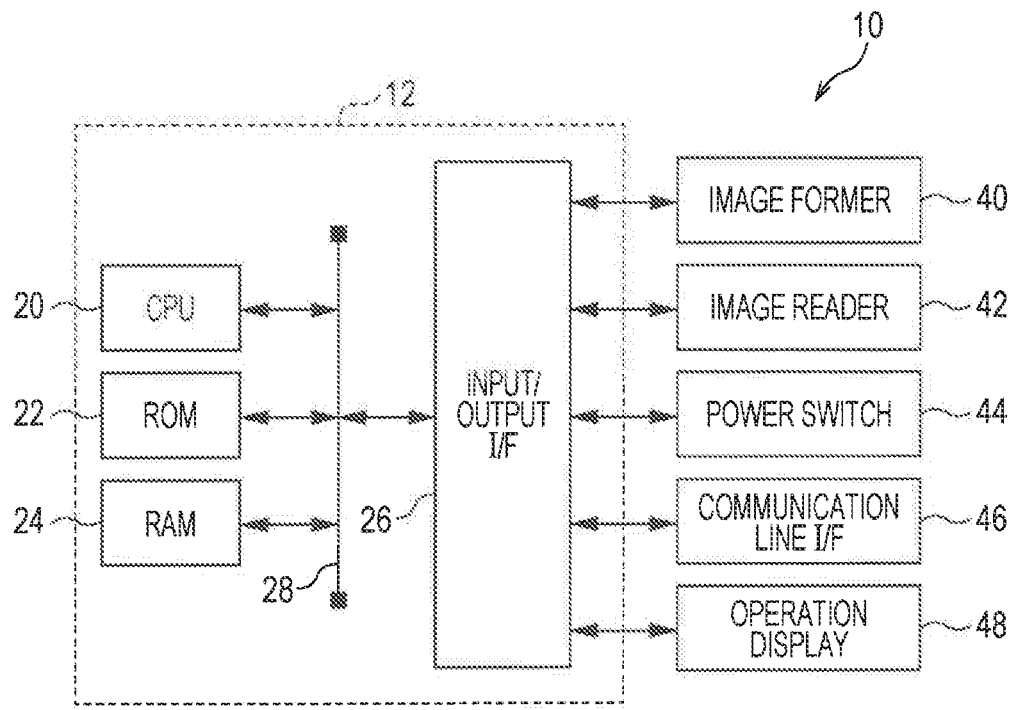
FIG. 1 is a block diagram illustrating the configuration of an image processing device according to an exemplary embodiment.

First, the configuration of an image processing device 10 according to this embodiment will be described with reference to FIG. 1. As illustrated in FIG. 1, the image processing device 10 according to this embodiment includes a control device 12, an image former 40, an image reader 42, a power switch 44, a communication line interface (I/F) 46, and an operation panel 48.

The control device 12 according to this embodiment includes a central processing unit (CPU) 20 that manages the overall operation of an image processing device 10, and a read only memory (ROM) 22 that is a non-volatile memory in which various programs and parameters are pre-stored. In addition, the control device 12 includes a random access memory (RAM) 24 which is a volatile memory and used as a work area at the time of execution of various programs by the CPU 20, and an input/output I/F 26.

The CPU 20, the ROM 22, the RAM 24, and the input/output I/F 26 are each connected to one another via a bus 28 such as an address bus, a data bus, and a control bus. In addition, the input/output I/F 26 is connected to the image former 40, the image reader 42, the power switch 44, the communication line I/F 46, and the operation panel 48.

The is age former 40 forms an image indicated by inputted image data on a paper sheet by an electrophotographic system, for instance. The image reader 42 includes an image reading sensor such as a charge coupled device (CCD) line sensor for instance, and outputs image data obtained by reading an image formed on a paper sheet to the CPU 20 via the input/output I/F 26.

The power switch 44 is a switch to be operated by a user to make a transit between a supply state (so-called a power supply ON state) in which power is supplied to the image processing device 10, and a shutdown state (so-called a power supply OFF state) in which power supply is shut down. In a supply state of the power supply of the image processing device 10, when an operation to set the image processing device 10 to a shutdown state is performed by a user via the power switch 44, the CPU 20 receives a shutdown command via the input/output I/F 26, the shutdown command setting the image processing device 10 to a shutdown state.

The communication line I/F 46 transmits and receives communication data to and from an external device. The operation panel 48 receives a command to the image processing device 10 from a user, and displays various pieces of information, for a user, on an operational state of and an operation menu for the image processing device 10. It is to be noted that the operation panel 48 includes, for instance, a display button to achieve a received operational command by execution of a program, a display in which a display surface for displaying various pieces of information is provided with a touch panel, and a hardware key such as a ten key and a start button.

In the image processing device 10 according to the present exemplary embodiment, for instance, when a job (hereinafter simply referred to as a "job"), which is a unit of processing of predetermined processing such as print, copy, and transmitting of a facsimile, is inputted, the job may be temporarily accumulated in the RAM 24 which is a volatile memory without being executed immediately. Also, in this case, after the job is accumulated, when a start command to start the execution of the job is received, the image processing device 10 executes the job. Also, the image processing device 10 according to the present exemplary embodiment allows an effective period of a job to be set. It is to be noted that the effective period may be a period with a starting point of a time of input of the job, or may be a time that indicates a completion time of the effective period of the job.

Furthermore, the image processing device 10 according to the present exemplary embodiment allows a start time of a job instead of an effective period of a job to be set. For a job for which a start time is designated, when the current time reaches the start time, the image processing device 10 executes the job.

For instance, when a user performs print processing, the user operates a terminal to transmit a print command, image data to be printed, and an effective period of the print processing to the image processing device 10. Thus, a job for performing the print processing by the image processing device 10 is accumulated.

In this case, a user inputs a start command to start the execution of the accumulated job via an operation menu displayed on the display of the operation panel 48 of the image processing device 10. Thus, the job is executed by the image processing device 10, and printing is performed.

For instance, when a user designates a performing transmission processing of a facsimile at a specific time, the user makes input for the transmission processing and the start time via the operation menu displayed on the display of operation panel 48 of image processing device 10. Thus, the job for performing transmission processing of a facsimile is accumulated in the image processing device 10. In this case, when the current time reaches the start time, the image processing device 10 executes the job, and a facsimile is transmitted.

It is to be noted that a job herein includes data such as image data as a target of processing used in the job, information on processing such as copying and printing to be executed in the job, and information on a paper sheet and information for performing the job, such as parameters related to the processing, such as a resolution of an image. Also, a job may be configured to include information on a user who is authorized to execute the job.

In addition, when a user uses the image processing device 10 according to the present exemplary embodiment, the user is to be authenticated by an identification (ID) card. Also, when being used, the image processing device 10 can obtain a user ID from the ID card.

Figure 2:
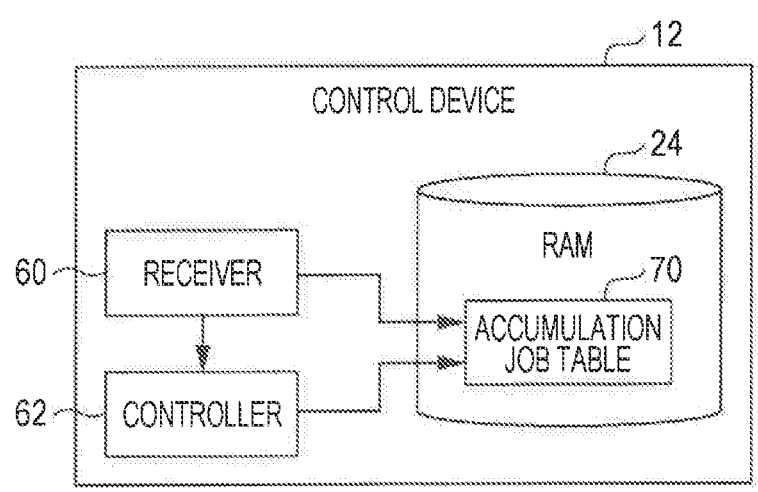
FIG. 2 is a functional block diagram of a control device of the image processing device according to the exemplary embodiment.

Next, the functional configuration of the control device 12 according to the present exemplary embodiment will be described with reference to FIG. 2. As illustrated in FIG. 2, the control device 12 includes a receiver 60 and a controller 62.

The receiver 60 receives a job and an effective period of the job via the communication line I/F 46 or the operation panel 48. In addition, the receiver 60 receives a user ID that uniquely identifies the user who has inputted the job. The receiver 60 then generates a job name that uniquely identifies the received job, and stores the generated job name, the received user ID, an effective period expiration time based on the effective period of the job in an accumulation job table 70 of the RAM 24. The RAM 24 is a volatile memory having such a capacity that allows the received job to be accumulated.

Figures 3, 4:
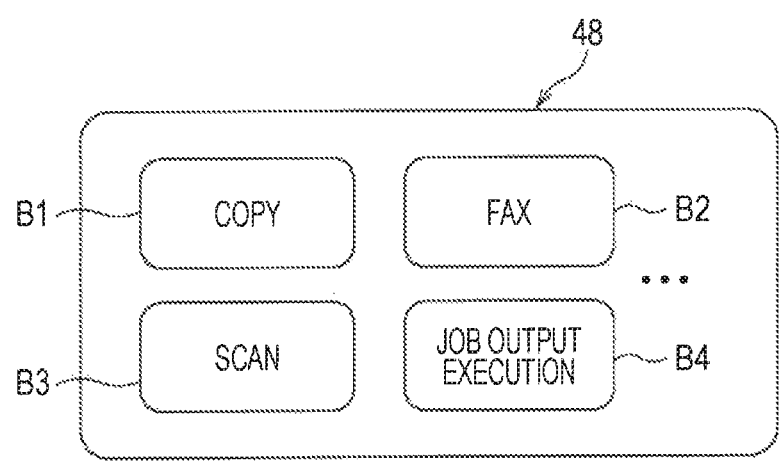
FIG. 3 is a table illustrating an example of an accumulation job table according to the exemplary embodiment.
FIG. 4 is a schematic diagram illustrating an example of an operation menu screen according to the exemplary embodiment.

FIG. 3 illustrates an example of the accumulation job table 70. As illustrated in FIG. 3, for each job, the accumulation job table 70 stores a job name, a user ID of user who has inputted the job, an effective period expiration time. When a job and an effective period of the job are received, the receiver 60 stores an effective period expiration time which is the time obtained by adding the effective period to a time at which the job has been received. Specifically, the image processing device 10 according to the present exemplary embodiment has no large-capacity non-volatile memory such as a hard disk drive (HDD) in which job data is stored, and job data is stored only in the RAM 24 which is a volatile memory.

Also, when a job is received and an effective period of the job is not received, the receiver 60 assumes that the default value (for instance, 10 minutes) of effective period has been received as an effective period. Specifically, in this case, the receiver 60 stores an effective period expiration time which is the time obtained by adding the default value of effective period to a time at which the job has been received.

Also, when a job and a start time of the job are received, the receiver 60 assumes that the start time is a time at which the effective period of the job expires, and stores the start time as the effective period expiration time. It is to be noted that although illustration is omitted in FIG. 3 to avoid complications, the accumulation job table 70 stores the above-described data, information included in a job, and information for performing a job such as parameters.

For instance, 1st record in FIG. 3 indicates an example in which a job with a job name of "jobA" inputted by a user with a user ID of "UserA" is received at "10:00:46" and the effective period is 30 minutes.

In addition, the receiver 60 receives via the input/output I/F 26 a shutdown command to set the power supply of the image processing device 10 to a shutdown state. In addition, the receiver 60 receives via the input/output I/F 26 a termination command to terminate the execution of a job corresponding to a record accumulated in the accumulation job table 70. In addition, the receiver 60 receives via the input/output I/F 26 a start command to start the execution of a job corresponding to a record accumulated in the accumulation job table 70.

When a shutdown command is received by the receiver 66, if no record is stored in the accumulation job table 70, in other words, if no job is accumulated in the image processing device 10, the controller 62 immediately performs control to set the power supply of the image processing device 10 to a shutdown state.

In contrast, when a shutdown command is received by the receiver 60 during the time since a job is received by the receiver 60 until the job is deleted from the RAM 24, after the job is deleted from the RAM 24 and is not present, the controller 62 performs control to set the power supply of the image processing device 10 to a shutdown state.

Specifically, when a shutdown command is received by the receiver 60 in a state where at least one record is stored in the accumulation job table 70, after each record stored in the accumulation job table 70 is deleted, the controller 62 performs control to set the power supply of the image processing device 10 to a shutdown state. Also, in this case, when multiple jobs are accumulated in the image processing device 10, after expiration of the effective period of the job with the latest expiring effective period, or when the records of all jobs are no longer present, the controller 62 performs control to set the power supply of the image processing device 10 to a shutdown state.

When a termination command to terminate the execution of a job is received by the receiver 60, the controller 62 deletes a record with a job name corresponding to the job from the accumulation job table 70. When a start command to start the execution of a job is received by the receiver 60, after the execution of the job is completed, the controller 62 deletes a record with a job name corresponding to the job from the accumulation job table 70. When the effective period of a job stored in the accumulation job table 70 expires, the controller 62 deletes a record with a job name corresponding to the job from the accumulation job table 70.

After a shutdown command is received by the receiver 60, when all records of the accumulation job table 70 are deleted, the controller 62 performs control to set the power supply of the image processing device 10 to a shutdown state.

The controller 62 performs control to prohibit the receiver 60 from receiving a new job during a time since the job is received by the receiver 60 until control is performed to set the power supply of the image processing device 10 to a shutdown state.

When a user who has inputted a job is authenticated by the image processing device 10 during a time since the job is received by the receiver 60 until control is performed to set the power supply of the image processing device 10 to a shutdown state after the shutdown command is received, the controller 62 performs control to output information for prompting an operation of the job.

Specifically, for instance, after a user is authenticated using an ID card by the image processing device 10, the controller 62 obtains a user ID from the ID card, and when a record including the obtained user ID is present in the accumulation job table 70, the controller 62 displays a job name of the record including the obtained user ID, and information for prompting execution or termination of the job with the job name, on the display of the operation panel 48.

In the case where start time is set to a job received by the receiver 60, when the current time reaches the start time, the controller 62 executes the job, and after the execution of the job is completed, the controller 62 deletes a record with a job name corresponding to the job from the accumulation job table 70.

Figure 5:
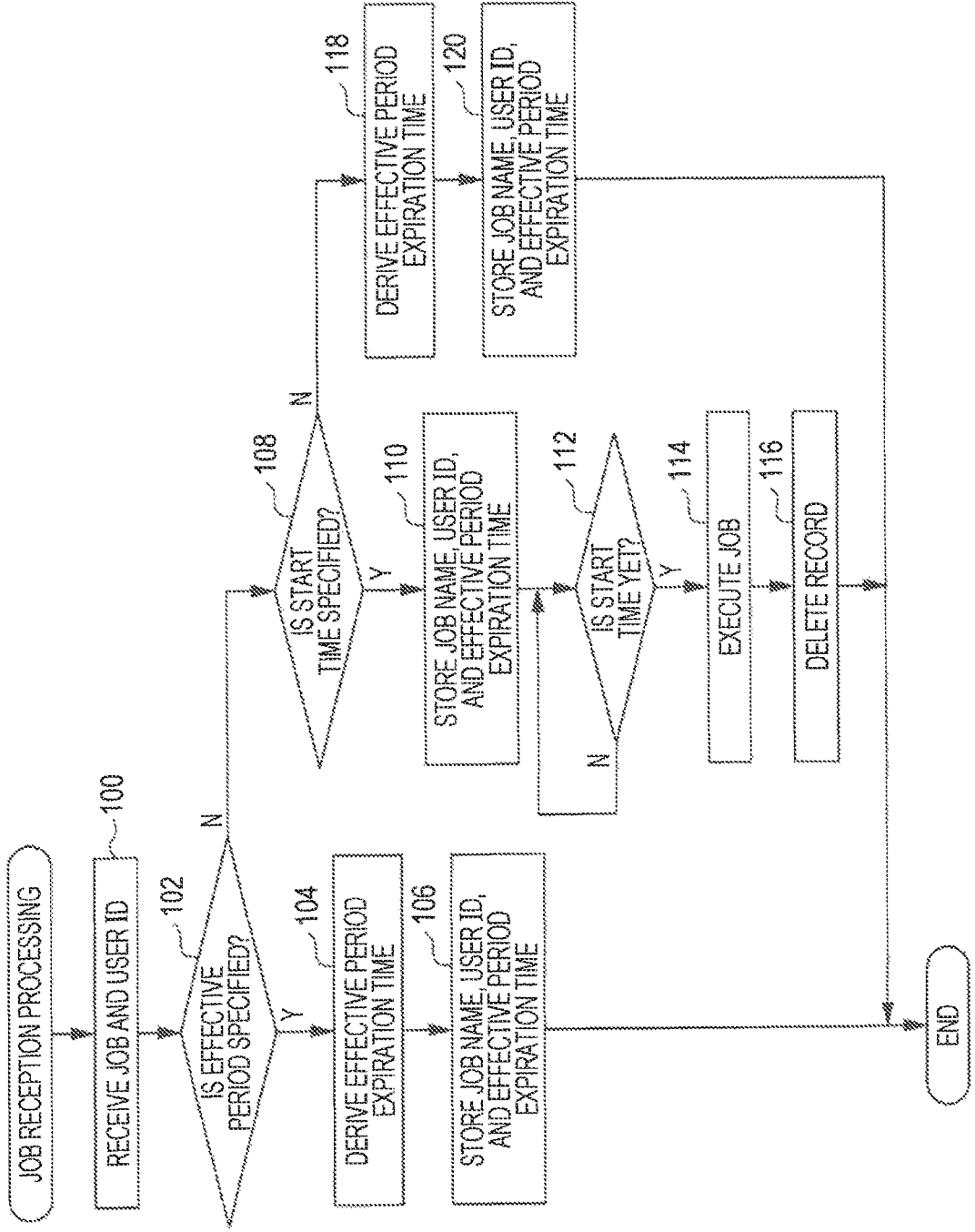
FIG. 5 is a flowchart illustrating an example of job reception processing according to the exemplary embodiment.

Next, the effect of the image processing device 10 according to the present exemplary embodiment will be described with reference to FIGS. 4 to 12. FIG. 5 is a flowchart illustrating the processing flow of a job reception processing program to be executed by the CPU 20. The job reception processing program is executed, for instance, when a job is inputted to the image processing device 10 by a user. The job reception processing program is pre-installed in the ROM 22.

In the image processing device 10 according to the present exemplary embodiment, a job for executing various processing such as print processing is transmitted to the image processing device 10 from an external device such as a terminal, and the job is thereby inputted to the image processing device 10.

Also, in the image processing device 10 according to the present exemplary embodiment, after a user is authenticated using an ID card, a command of an operation is inputted by the user via the operation menu screen which is displayed on the display of the operation panel 48 by the control of the controller 62. FIG. 4 illustrates an example of the operation menu screen. As illustrated in FIG. 4, the operation menu screen according to the present exemplary embodiment displays copy button B1 which is designated when a job for executing copy processing is inputted, and FAX button B2 which is designated when a job for executing facsimile transmission processing is inputted. In addition, the operation menu screen displays scan button B3 which is designated when a job for executing processing of reading an image formed on a paper sheet is inputted, and job output execution button B4 which is designated when a job for executing processing of outputting a job accumulated in the image processing device 10 is inputted.

In step 100 of FIG. 5, the receiver 60 receives a job and a user ID of the job inputted by a user. In the next step 102, the receiver 60 determines whether or not an effective period has been set to the job received in step 100. When an effective period has been set to the received job and the determination is affirmative, the processing proceeds to step 104.

In step 104, the receiver 60 derives an effective period expiration time by adding the effective period of the the time at which the job is received in step 100. In the next step 106, the receiver 60 accumulates the job name of the job received in step 100, the user ID, the effective period expiration time derived in step 104, information r executing the job in the accumulation job table 70, then completes the job reception processing.

In contrast, when no effective period has been set to the received job and the determination is negative, the processing proceeds to step 108. In step 108, the receiver GO determines whether or not a start time has been set to the job received in step 100. When the determination is affirmative, the processing proceeds to step 110. In step 110, the receiver 60 sets an effective period expiration time to the start time set to the job received in step 100. The receiver 60 then accumulates the job name of the job received in step 100, the user ID, the effective period expiration time, information for executing the job in the accumulation job table 70.

In the next step 112, the controller 62 stays in standby until the current time reaches the start time set to the job received in step 100. When the current time reaches the start time, the determination in step 112 is affirmative, and the processing proceeds to step 114.

In step 114, the controller 62 performs control to execute the job received in step 100. When processing of the executed job is completed, in the next step 116, the controller 62 deletes the record including the job name of the job received in step 100 from the accumulation job table 70, then completes the job reception processing.

When the determination in step 108 is negative, the processing proceeds to step 118. In step 118, the receiver 60 derives an effective period expiration time by adding the default value of effective period to the time at which the job has been received in step 100. In the next step 120, the receiver 60 accumulates the job name of the job received in step 100, the user ID, the effective period expiration time derived in step 118, information for executing the job in the accumulation job table then completes the job reception processing.

Figure 6:
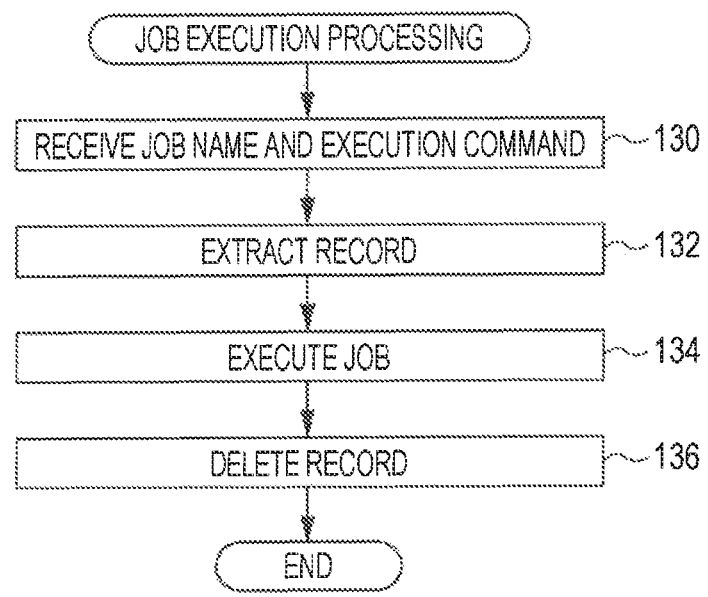
FIG. 6 is a flowchart illustrating an example of job execution processing according to the exemplary embodiment.

FIG. 6 is a flowchart illustrating the processing flow of a job execution processing program to be executed by the CPU 20. The job execution processing program is executed, for instance, when a job name and a start command for job output are inputted via the above-mentioned operation menu screen. In addition, the job execution processing program is executed, for instance, when a job name and a start command for job output are inputted from an external device via the communication line I/F 46. Also, the job execution processing program is pre-installed in the ROM 22.

In step 130 of FIG. 6, the receiver 60 receives a job name and a start command for job output which are inputted by a user. In the next step 132, the controller 62 extracts information for executing a job corresponding to the job name received in step 130, from the accumulation job table 70. In the next step 134, the controller 62 performs control to execute the job using the information extracted in step 132. For instance, the controller 62 forms an image of job data by the image former 40, and performs print output processing. When the output processing of the job is completed, in the next step 136, the controller 62 deletes the record including the job name received in step 130 and job data referred to in the record from the accumulation job table 70, then completes the job execution processing.

Figure 7:
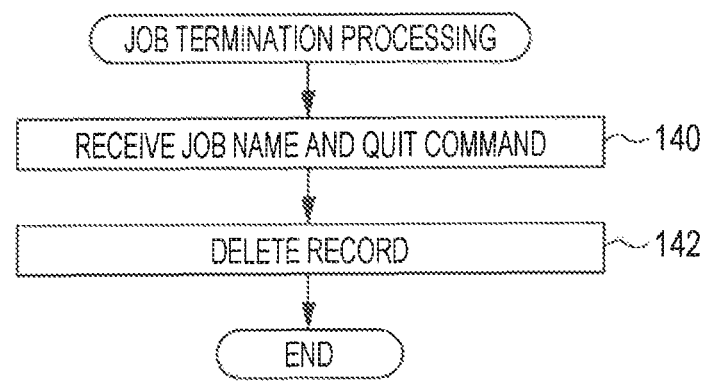
FIG. 7 is a flowchart illustrating an example of job termination processing according to the exemplary embodiment.

FIG. 7 is a flowchart illustrating the processing flow of a job termination processing program to be executed by the CPU 20. The job termination processing program is executed, for instance, when a job name and a termination command for the job are inputted via the above-mentioned operation menu screen. In addition, the job termination processing program may be executed, for instance, when a job name and a termination command for the job are inputted from an external device via the communication line I/F 46. Also, the job termination processing program is pre-installed in the ROM 22.

In step 140 of FIG. 7, the receiver 60 receives a job name and a termination command for the job which are inputted by a user. In the next step 142, the controller 62 deletes the record including the job name received in step 140 and job data referred to in the record from the accumulation job table 70, then completes the job termination processing.

Figure 8:
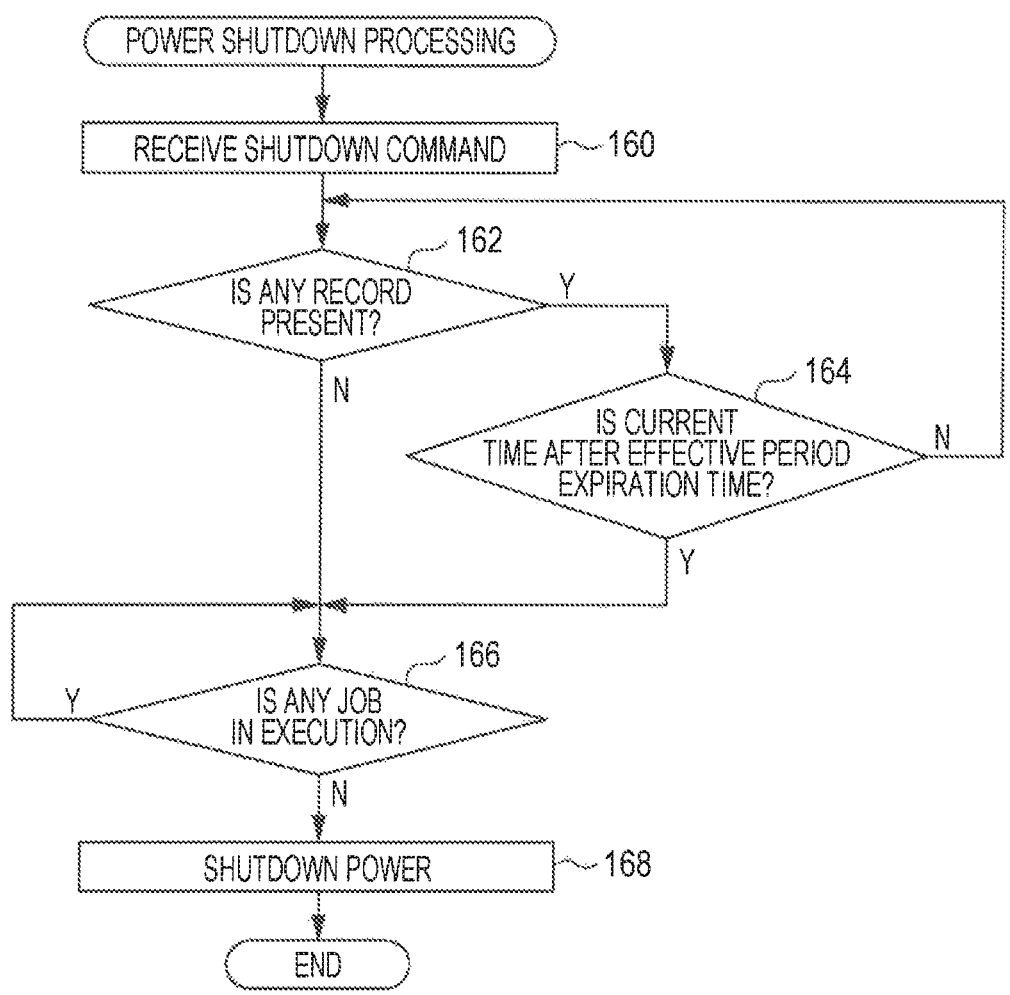
FIG. 8 is a flowchart illustrating an example of power supply shutdown processing according to the exemplary embodiment.

FIG. 8 is a flowchart illustrating the processing flow of a power supply shutdown processing program to be executed by the CPU 20. The power supply shutdown processing program is executed, for instance, when an operation to set the power supply of the image processing device 10 to a shutdown state is performed by a user via the power switch 44. Also, the power supply shutdown processing program is pre-installed in the ROM 22.

In step 160 of FIG. 8, the receiver 60 receives the above-mentioned shutdown command. In the next step 162, the controller 62 determines whether or not a record is stored in accumulation job table 70. When no record is stored in the accumulation job table 70 and the determination is negative, the processing proceeds to step 166, and when a record is stored in the accumulation job table 70 and the determination is affirmative, the processing proceeds to step 164.

In step 164, the controller 62 determines whether or not the time at which step 164 is executed is after the latest effective period expiration time of the records stored in the accumulation job table 70. When the determination is negative, the processing returns to step 162, and when the determination is affirmative, the processing proceeds to step 166.

In step 166, the controller 62 determines whether or not a job is being executed. When a job is being executed by the image processing device 10, the controller 62 stays in standby until the job in execution is completed. When no job is being executed by the image processing device 10, the determination in step 166 is affirmative, and the processing proceeds to step 168.

In step 168, the controller 62 performs control to set the power supply of the image processing device 10 to a shutdown state, then completes the power supply shutdown processing. In other words, when a job is accumulated in the image processing device 10 at the time when the image processing device 10 receives a shutdown command, after the effective period of the accumulated job expires, the power supply of the image processing device 10 is set to a shutdown state. Even in this case, when the above-mentioned job execution processing and the above-mentioned job termination processing are executed and all the accumulated jobs with non-expiring effective period are deleted, the power supply of the image processing device 10 is set to a shutdown state regardless of the effective period of the job. Also, in the case where the controller 62 of the image processing device 10 is configured to perform control to delete information on an accumulated job when the effective period of the accumulated job expires, when a shutdown command for the power supply is received, the power supply of the image processing device 10 may be controlled to a shutdown state under the conditions that a job accumulated in the image processing device 10 is no longer present because of completion of the execution processing of the job, execution of the termination processing of the job, or deletion of the job due to expiration of the effective period of the job.

Figure 9:
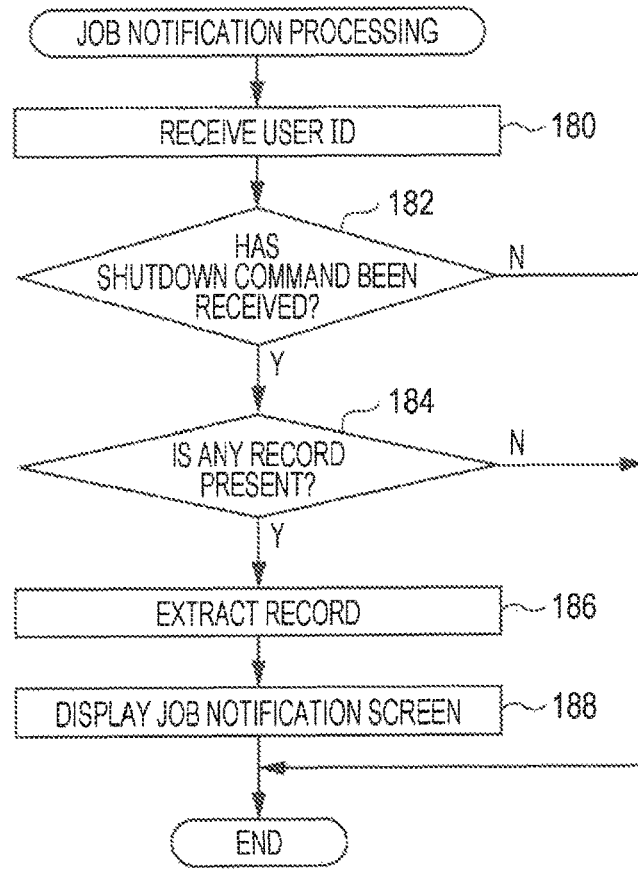
FIG. 9 is a flowchart illustrating an example of job notification processing according to the exemplary embodiment.

FIG. 9 is a flowchart illustrating the processing flow of a job notification processing program to be executed by the CPU 20. The job notification processing program is executed, for instance, when a user is authenticated using an ID card or the like by the image processing device 10, and a user ID is thereby obtained. Also, the job notification processing program is installed in the ROM 22.

In step 180 of FIG. 9, the receiver 60 receives an inputted user ID. In the next step 182, the controller 62 determines whether or not the current step is after the shutdown processing is received by the processing in step 160 of the power supply shutdown processing and before the processing of shutting down the power supply of the image processing device 10 is executed by the processing in step 168 of the power supply shutdown processing. When the determination is affirmative, the processing proceeds to step 184.

In step 184, the controller 62 determines whether or not a record including the user ID received in step 180 is present in the accumulation job table 70. When the determination is affirmative, the processing proceeds to step 186.

Figure 10:
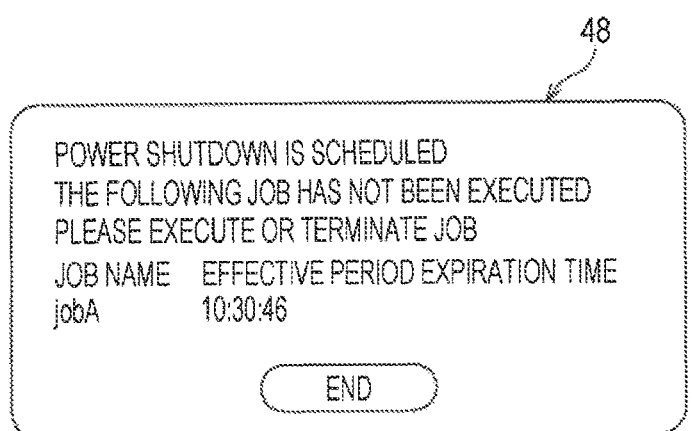
FIG. 10 is a schematic diagram illustrating an example of a job notification screen according to the exemplary embodiment.

In step 186, the controller 62 extracts a record including the user ID received in step 180 from the accumulation job table 70. In the next step 188, the controller 62 displays a job notification screen for prompting an operation to a job with the job name of the record extracted in step 186 on the display of the operation panel 48, then completes the job notification processing. FIG. 10 illustrates an example of the job notification screen. As illustrated in FIG. 10, the job notification screen according to the present exemplary embodiment displays information indicating that the power supply of the image processing device 10 is set to a shutdown state ("power supply OFF" is written in the example of FIG. 10). In addition, on the job notification screen, information indicating that a job, which has been inputted by the user, and accumulated in the image processing device 10 has not been executed is also displayed. In addition, the job notification screen also displays information for prompting execution or termination of the above-mentioned job which has not been executed. In addition, the job notification screen also displays a job name corresponding to the job which has not been executed, and the effective period expiration time of the job. Also, the job notification screen may be configured to display information for prompting execution or termination of the above-mentioned job which has not been executed as well as a button for inputting a command to execute or terminate the job, and be configured to allow a user to input a command to execute or terminate the job.

In contrast, when the determination in step 184 is negative, the processing in step 186 and step 188 is not executed, and the job notification processing is completed. Also, when the determination in step 182 is negative, the processing in step 184 to step 188 is not executed, and the job notification processing is completed without displaying the job notification screen.

Figure 11:
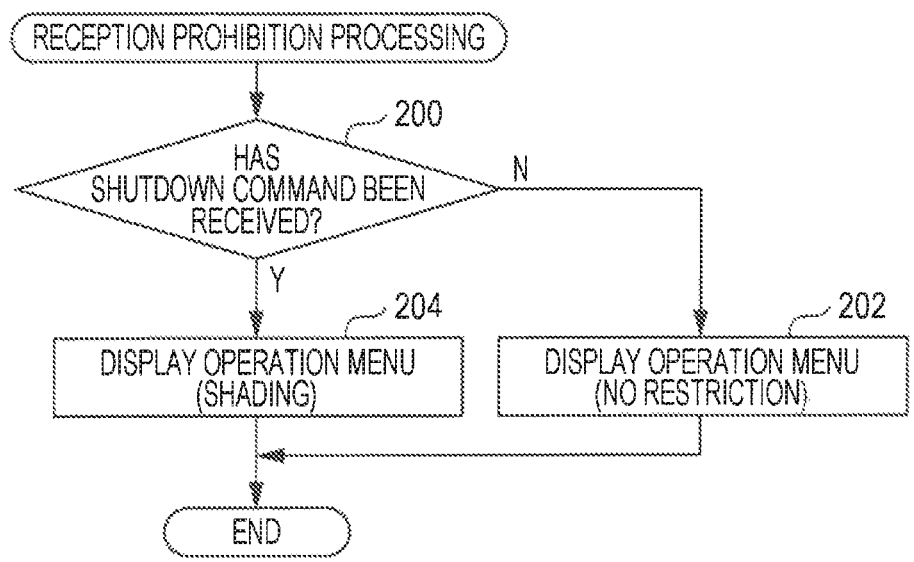
FIG. 11 is a flowchart illustrating an example of reception prohibition processing according to the exemplary embodiment.

FIG. 11 is a flowchart illustrating the processing flow of a reception prohibition processing program to be executed by the CPU 20. The reception prohibition processing program is executed, for instance, when a command to display the operation menu screen is inputted by a user. Also, the reception prohibition processing program is pre-installed in the ROM 22.

In step 200 of FIG. 11, the controller 62 determines whether or not the current step is after a shutdown command is received by the processing in step 160 of the power supply shutdown processing. When the determination is negative, the processing proceeds to step 202.

In step 202, the controller 62 displays the first operation menu screen, which does not restrict receiving of a new job, on the display of the operation panel 48, then completes the reception prohibition processing. It is to be noted that the first operation menu screen displayed here is the same as a normal operation menu screen illustrated in FIG. 4, and thus a description is omitted here.

Figure 12:
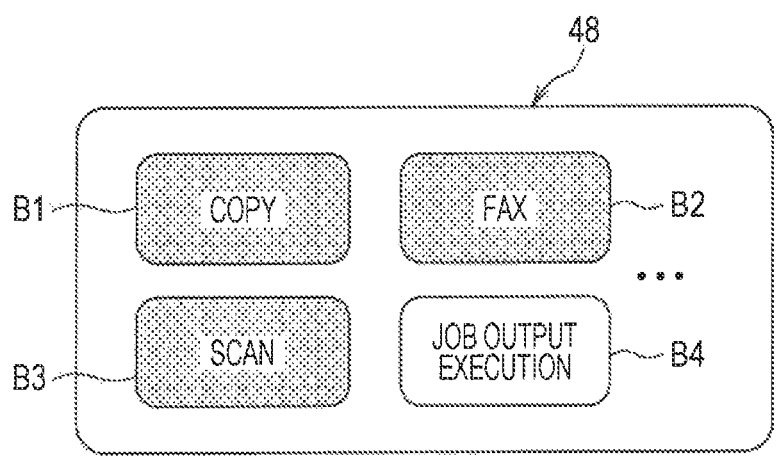
FIG. 12 is a schematic diagram illustrating an example of the second operation menu screen according to the exemplary embodiment.

In contrast, when the determination in step 200 is affirmative, specifically, when a shutdown command for the power supply has been received, the processing proceeds to step 204. In step 204, the second operation menu screen, which prohibits receiving of a new job and only allows operation of accumulated jobs, is displayed on the display of the operation panel 48. FIG. 12 illustrates an example of the second operation menu screen.

As illustrated in FIG. 12, similarly to the first operation menu screen, the second operation menu screen according to the present exemplary embodiment displays a copy button B1, a FAX button B2, a scan button B3, and a job output execution button B4. However, on the second operation menu screen according to the present exemplary embodiment, each button other than job output execution button B4 is displayed in gray shading, and designation by a user is not possible. Thus in the present exemplary embodiment, after the image processing device 10 receives the shutdown command, receiving of a new job is prohibited and only operation of accumulated jobs is allowed.

In the present exemplary embodiment, after a shutdown command is received by the processing in step 160 of the power supply shutdown processing, the controller 62 also prohibits receiving of a new job via the communication line I/F 46. In this case, for instance, when a new job is received by the receiver 60 via the communication line I/F 46, the controller 62 transmits information to the transmission source of the job, the information indicating that receiving of a new job is prohibited.

The various processing programs are executed by the CPU 20, and thus the CPU 20 operates as the receiver 60 and the controller 62 illustrated in FIG. 2.

Next, an example of processing sequence, which sets the power supply of the image processing device 10 to a shutdown state, will be described with reference to FIGS. 13 and 14. It is to be noted that FIG. 13 illustrates an example of processing sequence in the case where after the image processing device 10 receives the shutdown command, a job is executed before the effective period of the job expires. FIG. 14 illustrates an example of processing sequence in the case where after the image processing device 10 receives the shutdown command, the effective period has expired without execution of a job.

As illustrated in FIG. 13, in step 300, a job with an effective period of 60 minutes is inputted by a user A, for instance, from an external device to the image processing device 10. The job inputted in step 300 is received by the CPU 20 in the job reception processing, and is stored in the accumulation job table 70. It is to be noted that at this point, the image processing device 10 has not received the shutdown command. Thus, when the image processing device 10 displays the operation menu screen, the determination in step 200 of the reception prohibition processing is negative, and the first operation menu screen (see FIG. 4), which does not restrict receiving of a new job, is displayed by the processing in step 202.

Next, in step 302, for instance 30 minutes has elapsed since a job has been inputted in step 300, then an operation to set the power supply of the image processing device 10 to a shutdown state is performed by a user B via the power switch 44. This operation causes the power supply shutdown processing to be executed, and the CPU 20 refers to the accumulation job table 70. At this point, the effective period of the job inputted in step 300 has not expired. Thus, at this point, the determination in step 162 of the power supply shutdown processing and the determination in step 164 are repeatedly affirmative and negative, respectively, and the CPU 20 does not perform control to set the power supply of the image processing device 10 to a shutdown state.

At this time, the image processing device 10 has received the shutdown command. Thus, when the image processing device 10 displays the operation menu screen, the determination in step 200 of the reception prohibition processing is affirmative, and the second operation menu screen (see FIG. 12), which prohibits receiving of a new job, is displayed by the processing in step 204.

Next, in step 304, after 15 minutes has elapsed since the power switch 44 has been operated in step 302, a start command to start output processing of the job inputted in step 300 is inputted by the user A via the second operation menu screen.

The job execution processing is executed by the input of the start command, and the CPU 20 executes output processing of the job in step 306 (step 134 of the job execution processing). After executing the job, the CPU 20 deletes from the accumulation job table 70, a record corresponding to the executed job by the processing in step 136 of the job execution processing.

When the processing of deleting a record is executed, no record is present in the accumulation job table 70. Therefore, in the power supply shutdown processing for which execution has been started by receiving the shutdown command, the determination in the above-described step 162 is negative. After the executed job is completed, the CPU 20 performs control to set the power supply of the image processing device 10 to a shutdown state in step 308 (step 168 of the power supply shutdown processing).

Meanwhile, as illustrated in FIG. 14, similarly to FIG. 13, in step 300, a job with an effective period of 60 minutes is inputted to the image processing device 10 by the user A. Next, similarly to FIG. 13, in step 302, after 30 minutes has elapsed since a job has been inputted in step 300, an operation to set the power supply of the image processing device 10 to a shutdown state is performed by the user B via the power switch 44.

It is assumed that a start command to start execution of the job inputted in step 300 is not inputted by the user A, and 60 minutes has elapsed since the job has been inputted in step 300. In this case, the effective period of the job inputted in step 300 has expired. Thus, in the power supply shutdown processing for which execution has been started by receiving the shutdown command, the determination of step 162 and the determination of step 164 are affirmative, and the determination of step 166 is negative. That is, in this case, the CPU 20 performs control to set the power supply of the image processing device 10 to a shutdown state in step 320 (step 168 of the power supply shutdown processing).

It is to be noted that in the exemplary embodiment, the case has been described in which a user is authenticated by an ID card and a user ID is obtained from the ID card. However, the invention is not limited to this. A configuration may be adopted in which when a user operates the image processing device 10, a screen to which a user ID is inputted is displayed, and the inputted user ID is obtained from the screen.

Also, in the exemplary embodiment, the start command and the termination command may be received only from a user who has inputted the job. In this case, a configuration is illustrated in which the image processing device 10 executes and terminates a job only when the user ID of the user who has inputted the start command or the termination command matches with the user ID extracted from the record corresponding to the job.

In the exemplary embodiment, the case has been described in which various processing programs are pre-installed in the ROM 22. However, the invention is not limited to this. For instance, a configuration may be adopted in which various processing programs are stored in a storage medium such as a compact disk read only memory (CD-ROM) and provided or various processing programs are provided via a network.

Furthermore, in the exemplary embodiment, the case has been described in which various processing is achieved by a software configuration utilizing a computer through executing programs. However, the invention is not limited to this. For instance, a configuration may be adopted in which various processing is achieved by a hardware configuration, or a combination of a hardware configuration and a software configuration.

In addition, the configuration (see FIG. 1 and FIG. 2) of the image processing device 10 described in the exemplary embodiment is an example, and it goes without saying that in a range not departing from the spirit of the present invention, an unnecessary portion may be deleted, or a new portion may be added.

Also, the various processing flows (see FIGS. 5 to 9, and FIG. 11) described in the exemplary embodiment are merely examples, and it goes without saying that in a range not departing from the spirit of the present invention, an unnecessary step may be deleted, a new step may be added, or the order of processing may be changed.

The foregoing description of the exemplary embodiment of the present invention can has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a receiver that receives a job that is a unit of processing of predetermined processing, an effective period of the job, and a shutdown command which sets a power supply of the device itself to a shutdown state, wherein expiration of the effective period of the job signifies a start time for starting execution of the job; and
   a controller that, when the shutdown command is received by the receiver, performs control to maintain the power supply in a supply state in response to determining that the effective period has not expired.

2. The information processing device according to claim 1,
   wherein the receiver further receives a termination command to terminate execution of the job, and
   when the termination command is received after the shutdown command is received by the receiver, the controller performs control to set the power supply to the shutdown state regardless of the effective period of the job.

3. The information processing device according to claim 2,
   wherein after the shutdown command is received by the receiver, the controller performs control to prohibit the receiver from receiving a new job.

4. The information processing device according to claim 1,
   wherein the receiver further receives a start command to start execution of the job, and
   when the start command is received after the shutdown command is received by the receiver, the controller performs control to set the power supply to the shutdown state after the job is completed regardless of the effective period of the job.

5. The information processing device according to claim 4,
   wherein after the shutdown command is received by the receiver, the controller performs control to prohibit the receiver from receiving a new job.

6. The information processing device according to claim 1,
   wherein when plural pieces of the job are received, the effective period is an effective period of a job with a latest expiring effective period.

7. The information processing device according to claim 6,
   wherein after the shutdown command is received by the receiver, the controller performs control to prohibit the receiver from receiving a new job.

8. The information processing device according to claim 1,
   wherein when the effective period of a job received by the receiver expires, the controller deletes information on the job.

9. The information processing device according to claim 8,
   wherein after the shutdown command is received by the receiver, the controller performs control to prohibit the receiver from receiving a new job.

10. The information processing device according to claim 1,
    wherein after the shutdown command is received by the receiver, the controller performs control to prohibit the receiver from receiving a new job.

11. The information processing device according to claim 1,
    wherein the controller performs control to output information for prompting an operation of the job, during a time since the job is received by the receiver until control is performed to set the power supply to the shutdown state after the shutdown command is received.

12. The information processing device according to claim 1,
    wherein information on a job received by the receiver is stored in only a volatile memory.

13. A non-transitory computer readable medium storing a program causing a computer to function as the receiver and the controller of the information processing device according to claim 1.

14. The information processing device according to claim 1,
    wherein, when the shutdown command is received by the receiver, the controller
    (i) performs control to set the power supply to the shutdown state in response to determining that the effective period has expired and also that the job has been completed, and
    (ii) performs control to maintain the power supply in a supply state in response to determining that the effective period has not expired or that the job has not been completed.

15. An information processing method comprising:
    receiving a job that is a unit of processing of predetermined processing, an effective period of the job, and a shutdown command which sets a power supply of a device itself to a shutdown state, wherein expiration of the effective period of the job signifies a start time for starting execution of the job; and
    when the shutdown command is received, performing control to maintain the power supply in a supply state in response to determining that the effective period has not expired.

* * * * *